March 5, 1963 — C. TROTIN — 3,079,788
TORQUE RESPONSIVE MEASURING APPARATUS
Filed June 17, 1960

March 5, 1963 C. TROTIN 3,079,788
TORQUE RESPONSIVE MEASURING APPARATUS
Filed June 17, 1960 2 Sheets-Sheet 2

United States Patent Office 3,079,788
Patented Mar. 5, 1963

3,079,788
TORQUE RESPONSIVE MEASURING APPARATUS
Charles Trotin, Clamart, France, assignor, by mesne assignments, to ARCA Premoncontrole, Gentilly (Seine), France, a French company
Filed June 17, 1960, Ser. No. 36,879
Claims priority, application France Apr. 4, 1960
6 Claims. (Cl. 73—59)

The invention has for its object a torque responsive measuring apparatus and special embodiments of such an apparatus enabling, inter alia, a speed to be measured or the adjustment of certain parameters to be carried out, for example the adjustment of consistency.

According to the invention, there is provided torque responsive measuring apparatus comprising, on the one hand, two members at least one of which is rotatable and which are rotatable relative to one another, one of the two members carrying a vane and the other carrying a nozzle through which a fluid under pressure may be passed and be directed towards the vane, and, on the other hand, a device for measuring the pressure of the fluid in the feed pipe of the nozzle.

The invention will now be described with reference to a number of embodiments given by way of example and shown in the drawings.

Figure 1:
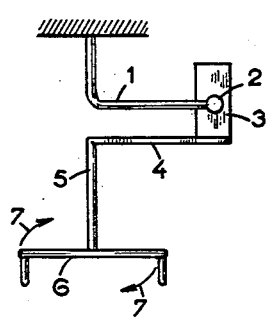
FIGURE 1 is a very diagrammatic view in elevation of an apparatus for measuring a torque exerted on a crank handle.

The apparatus shown in FIGURE 1 comprises a fixed arm 1 forming a conduit for a fluid such as compressed air and opening out through a nozzle 2.

Opposite the orifice of the nozzle there is disposed a vane 3 fast with an arm 4 fixed to a rotatably mounted shaft 5. A crank handle 6 is fixed to the shaft 5.

The crank handle 6 tends to turn in the direction of the arrows 7 under the action of a means not shown in the drawing.

The assembly comprising the vane 3, the arm 4, the shaft 5 and the crank handle 6 is subjected to a torque exerted on the crank handle and to an opposing or counter torque generated by the reaction of the nozzle 2 on the vane 3.

The torque exerted on the crank handle 6 is proportional to the pressure of the air in the pipe 1. The result is that if a device for measuring the pressure of the air in the pipe 1 is provided, it is possible to deduce therefrom the value of the torque exerted on the handle 6. The device for measuring the pressure of the air may moreover be calibrated not in pressure, but in torque.

Figure 2:
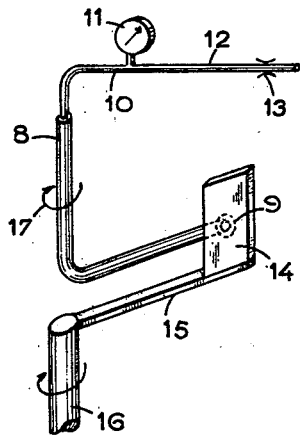
FIGURE 2 is a very diagrammatic view in elevation of an apparatus enabling a speed to be measured.

FIGURE 2 shows a different form of construction enabling a speed to be measured. The apparatus shown in FIGURE 2 comprises a rotary driving shaft 8 forming a conduit and opening into a nozzle 9. The shaft 8 is in communication through the intermediary of a rotating joint with a fixed pipe 10 to which a gauge 11 is connected. The pipe 10 is supplied from a general pipe line 12 through the intermediary of a diaphragm.

In front of the nozzle 9, and independently thereof, there is disposed a vane 14 carried by an arm 15 mounted on a shaft 16 which can be rotated when the vane 14 is subjected to the reaction of the nozzle 9.

When the shaft 8 rotates in the direction of the arrow 17, the compressed air escaping from the nozzle 9 acts on the vane 14 and causes the shaft 16 to rotate. If it is assumed that said shaft 16 is subjected to a resisting torque of constant value, the device 11 for measuring the pressure prevailing in the pipe 10 will give indications not in respect of the torque, which is constant, but in respect of the speed of rotation.

It is to be noted that if the torque due to the reaction of the nozzle 9 is insufficient, said torque can act on the vane 14 through the intermediary of a frictionless force amplifier, for example a bellows, a diaphragm or any other similar system.

The apparatus shown in FIGURE 2 could, of course, be used for measuring a variable resisting torque if the speed at which the shaft 16 is driven is constant.

The device measuring the pressure of the compressed air may be used to supply impulses to a control device disposed either close by or on a board located at a distance.

The invention may be utilised for measuring the resisting torque generated by the frictional layer of a mass immersed in a fluid.

For example, it is possible to fix on the shaft 16 (FIGURE 2) a sphere, which is thus driven through the intermediary of the nozzle 9 and the vane 14. When the speed of rotation is rather low, that is to say the frictional layer of the fluid in which the sphere is immersed is in a laminar condition, the viscosity has a predominating influence.

If the sphere is driven at constant speed, the pressure of the compressed air in the pipe 10 varies as a function of the viscosity. The measuring device 11 can then be calibrated in viscosity and not in pressure and a regulator can utilise this pressure as a quantity to be adjusted.

The applications are manifold, but it may be pointed out that the regulator may act, for example, either on the heating temperature of the liquid in which the sphere is immersed—and one of the applications is the maintenance of the stability of the viscosity of a liquid fuel—or on the input of a supply of a secondary liquid in order to keep the viscosity of a primary liquid constant—and one application in that case is the adjustment of the consistency of paper pulp or the manufacture of an oil of given viscosity.

Figure 3:
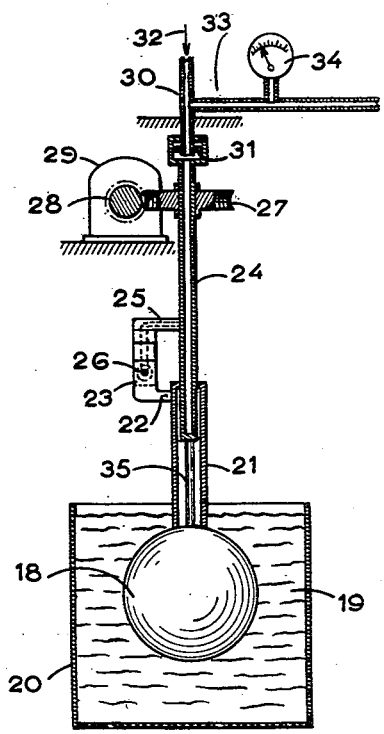
FIGURE 3 is a diagrammatic view, partly in section, of an apparatus which can be used for regulating the consistency of a liquid.
Figure 4:
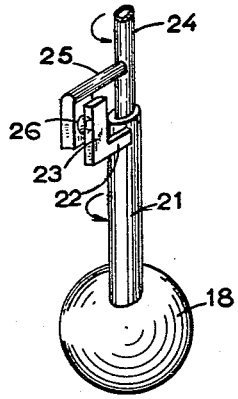
FIGURE 4 is a perspective view of a part of the apparatus shown in FIG. 3.

FIGURES 3 and 4 show diagrammatically an apparatus for regulating the consistency of paper pulp.

The idea of consistency of a paper pulp may be likened to that of viscosity. It is therefore possible to determine the consistency of the paper pulp by measuring the resisting torque generated by the frictional layer of an immersed mass forming a sensitive means and driven at strictly constant speed.

The mass is formed by a sphere 18 disposed in the mass of paper pulp 19. The paper pulp is contained in a tank 20.

The sphere 18 is fast with a hollow shaft 21 carrying an arm 22 provided with a vane 23.

A second hollow shaft 24 serves as a compressed air pipe. It opens into an arm 25 supplying a nozzle 26. The nozzle 26 sends a jet of compressed air on to the vane 23.

The shaft 24 is rotated by a toothed wheel 27 in mesh with a worm 28, which is itself driven by a motor 29. The drive is carried out at constant speed.

The shaft 24 is connected to a fixed pipe 30 through the intermediary of an air-tight rotating coupling 31. The compressed air is introduced into the pipe 30 through an orifice 32 connected to any pipe line whatsoever.

A branch pipe 33 is in communication with the pipe 30 and enables the pressure to be checked by a measuring device 34, on the one hand, and said pressure to be utilised, in particular, for registering the same or for regulating different parameters, on the other hand. For example, the pressure may be used for regulating the consistency of the paper pulp by adding water.

A torsion bar 35 is connected to the lower end of hollow shaft 24 and is connected to sphere 18. Hollow shaft 21 is connected at its lower end to sphere 18 and surrounds bar 35. The torque of the bar 35 remains constant and enables the zero of the apparatus to be adjusted for a given initial resisting torque.

According to the value of the consistency of the pulp, the immersed mass may take different shapes, that of a cylinder or a sphere, for example.

The apparatus which has just been described operates in the following manner.

The motor 29 drives the nozzle 26 at constant speed, for example 70 revolutions per minute. This speed is limited so that the layer rubbing on the sphere 18 remains in a laminar condition.

Under the effect of the consistency of the pulp 19, the sphere 18 is braked and, in order to drive said sphere, it is necessary to create a certain modulated pressure in the nozzle 26 so as to obtain a torque opposing the resisting torque. The variation of the modulated pressure faithfully translates the variation of the resisting torque and is proportional thereto. As it is known, furthermore, that the viscosity is a function of the resisting torque, the result is that the modulated pressure detected by the measuring device 34 is a function of the viscosity of the paper pulp in which the sphere 18 is immersed. When the viscosity increases, the modulated pressure increases and conversely.

This modulated pressure may simultaneously effect remote control of a recording device or an indicator graduated in consistency and a regulator acting on the diluting water so as to maintain the consistency of the pulp constant.

Figure 5:
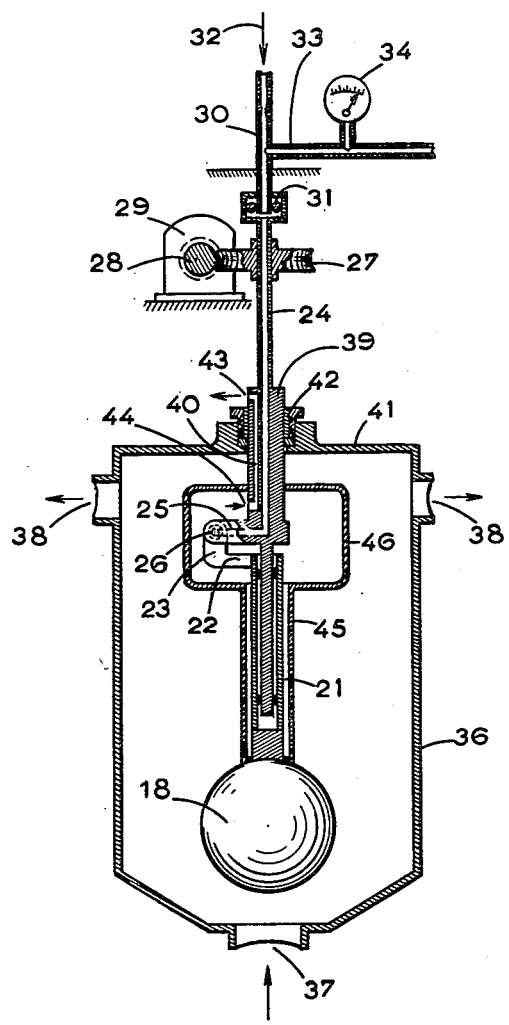
FIGURE 5 is a section, similar to that shown in FIGURE 3, of a modified form of construction.

FIGURE 5 is a section of an apparatus for measuring the consistency of paper pulp, the section being taken along a vertical plane.

The apparatus for measuring the consistency of paper pulp comprises a sensitive means constituted by a ball 18 immersed in the paper pulp disposed inside a liquid-tight vessel 36.

The paper pulp enters through the bottom part 37 and may be removed through lateral apertures 38.

The ball 18 is fast with a vane 23 through the intermediary of a tube 21 and an arm 22.

The vane 23 constitutes one of the two rotating members.

The other member is the nozzle 26 carried by an arm 25 mounted on a rotating shaft 24.

The shaft 24 is hollow and receives a fluid under pressure, as indicated by the arrow 32.

The fluid takes a fixed pipe 30 to move towards the nozzle 26, and a fluid-tight packing 31 is disposed between the fixed pipe 30 and the hollow rotating shaft 24. The latter is driven by a toothed wheel 27 in mesh with a worm 28 driven by a motor 29.

The shaft 24 is fast with a sleeve 39 having an internal duct 40. The sleeve 39 rotates with the shaft 24 and is located at a height such that it extends through the top 41 of the chamber 36. According to the invention, a sealing device 42 is provided between the sleeve 39 and the top 41. The duct 40 opens outside the chamber at 43 and inside the chamber it opens at 44 in the immediate vicinity of the nozzle 26.

The two members 23 and 26 in relative rotation are connected to one another by a torsion tube 45. This tube is fixed to the top part of the sphere 18. It widens in the form of a box 46 to enclose the vane 23 and the nozzle 26. The box is moreover secured to the sleeve 39 at a point located above the orifice 44 of the duct 40.

The result of this arrangement is that the driving fluid escaping from the nozzle 26 does not modify the pressure inside the chamber 36, but can escape through the sealing device 42 by way of the orifice 43.

The operation of this apparatus is similar to that described in connection with FIGURE 3.

When the nozzle 26 is driven so that it is rotated, the vane 23 is pushed back and causes rotation of the sphere 18, which measures the viscosity, that is to say the consistency of the paper pulp, provided, of course, that the rotary movement is slow so as to preserve a laminar condition.

During the rotation, the driving fluid escapes from the nozzle 26 and creates in a branch pipe 33 a pressure which can be measured by a gauge 34. The latter may be graduated in consistency of the paper pulp.

If the consistency should happen to change, the pressure in the branch pipe 33 would also vary and its variation could be used to control the regulation of the consistency of the pulp.

Since the sealing device 42 is placed around the sleeve 39 carried by the shaft 24, the friction induced by this device does not influence in any way the measurement of the consistency, all the causes of mechanical friction being thus transferred between the measuring means and the motor and reduction gear unit 27, 28, 29.

Of course, the invention is not limited by the details of the embodiments which have just been described and modifications may be made in the latter without departing from the scope of the invention.

What I claim is:

1. In a torque responsive measuring apparatus, a rotatable member, a second member rotatable relative to said first member, a vane carried by one of said members, a nozzle carried by the other of said members supplied with fluid under pressure and directed against said vane and means for measuring the fluid pressure supplied to said nozzle, rotation of one of said members being resisted by a torque to be measured and the other of said members rotating in a direction opposite to the direction of said torque.

2. Torque responsive measuring apparatus as described in claim 1, including an element immersed in a fluid creating a resisting torque said element being connected to one of said members and means for rotating the other of said members.

3. Torque responsive measuring apparatus as described in claim 2 in which said rotated member is rotated at a constant speed and the viscosity of said fluid is subject to variation.

4. Torque responsive measuring apparatus as described in claim 1, including a torsion bar connecting said members tending to bring said vane and said nozzle together.

5. Torque responsive measuring apparatus as described in claim 1, including a liquid tight chamber containing said members, a shaft driving said rotated member extending through the wall of said chamber and a sealing device for said shaft at said wall.

6. Torque responsive measuring apparatus as described in claim 5, including a torsion system forming a box connecting and containing said members and receiving fluid escaping from said nozzle, said box discharging outside of said liquid tight chamber to evacuate said fluid.

References Cited in the file of this patent

UNITED STATES PATENTS

| | | |
|---|---|---|
| 2,468,370 | Kalle | Apr. 26, 1949 |
| 2,635,465 | White | Apr. 21, 1953 |
| 2,917,065 | Monk | Dec. 15, 1959 |